US009723562B2

(12) United States Patent
Deng

(10) Patent No.: US 9,723,562 B2
(45) Date of Patent: Aug. 1, 2017

(54) POSITION-BASED MOBILE TERMINAL POWER MANAGEMENT DEVICE

(71) Applicant: BORQS WIRELESS LTD., Beijing (CN)

(72) Inventor: Yanqun Deng, Beijing (CN)

(73) Assignee: BARQS WIRELESS LTD. (CN)

( * ) Notice: Subject to any disclaimer, the term of this patent is extended or adjusted under 35 U.S.C. 154(b) by 0 days.

(21) Appl. No.: 14/416,553

(22) PCT Filed: Nov. 2, 2012

(86) PCT No.: PCT/CN2012/083957
§ 371 (c)(1),
(2) Date: Jan. 22, 2015

(87) PCT Pub. No.: WO2014/019296
PCT Pub. Date: Feb. 6, 2014

(65) Prior Publication Data
US 2015/0208351 A1 Jul. 23, 2015

(30) Foreign Application Priority Data

Jul. 31, 2012 (CN) .................... 2012 2 0374377 U

(51) Int. Cl.
H04W 24/00 (2009.01)
H04W 52/02 (2009.01)
(Continued)

(52) U.S. Cl.
CPC ......... H04W 52/0251 (2013.01); H04W 4/02 (2013.01); H04W 52/283 (2013.01); Y02B 60/50 (2013.01)

(58) Field of Classification Search
USPC .............................. 455/456.1–456.3; 370/380
See application file for complete search history.

(56) References Cited

U.S. PATENT DOCUMENTS 7,269,162 B1 * 9/2007 Turner ................ H04M 1/2478
370/352
7,373,144 B1 * 5/2008 Kirkpatrick ......... H04L 12/5855
455/421

(Continued)

FOREIGN PATENT DOCUMENTS

CN 102438079 5/2012 ............. H04M 1/73
WO WO2009153390 12/2009 ............ H04W 48/04

OTHER PUBLICATIONS

International Search Report issued in corresponding application No. PCT/CN2012/083957, dated May 9, 2013 (4 pgs).

Primary Examiner — Marcos Batista
(74) Attorney, Agent, or Firm — Hayes Soloway P.C.

(57) ABSTRACT

A position-based mobile terminal power management device, includes a positioning module connected to the power management and control module; a network connection monitoring module connected to the power management and control module; a power management and control module connected to the positioning module, network connection monitoring module, storage module, and terminal function module respectively; a storage module connected to the power management and control module; and a terminal function module connected to the power management and control module. With the device, a mobile terminal can automatically enable or disable the accessory devices thereof according to the position of the mobile terminal, thus saving power and facilitating use by a user.

5 Claims, 1 Drawing Sheet

(51) Int. Cl.
*H04W 52/28* (2009.01)
*H04W 4/02* (2009.01)

(56) References Cited

U.S. PATENT DOCUMENTS

| | | | |
|---|---|---|---|
| 8,453,051 B1* | 5/2013 | Weiss | H04N 21/23439 |
| | | | 715/234 |
| 9,113,077 B2* | 8/2015 | Mirzaei | H04N 5/23248 |
| 2006/0129317 A1* | 6/2006 | Farmer | G01S 19/06 |
| | | | 701/469 |
| 2008/0057939 A1* | 3/2008 | Choi-Grogan | H04W 68/02 |
| | | | 455/425 |
| 2008/0057955 A1* | 3/2008 | Choi-Grogan | H04W 8/04 |
| | | | 455/435.1 |
| 2009/0197572 A1* | 8/2009 | Feder | H04W 76/007 |
| | | | 455/411 |
| 2009/0258649 A1* | 10/2009 | Salowey | H04W 4/02 |
| | | | 455/435.2 |
| 2011/0206025 A1* | 8/2011 | Cadenas Gonzalez | |
| | | | H04W 64/003 |
| | | | 370/338 |
| 2012/0005026 A1* | 1/2012 | Khan | G06Q 30/02 |
| | | | 705/14.64 |
| 2012/0052873 A1 | 3/2012 | Wong | 455/456.1 |
| 2012/0315880 A1* | 12/2012 | Peitrow | H04M 1/642 |
| | | | 455/412.1 |

* cited by examiner

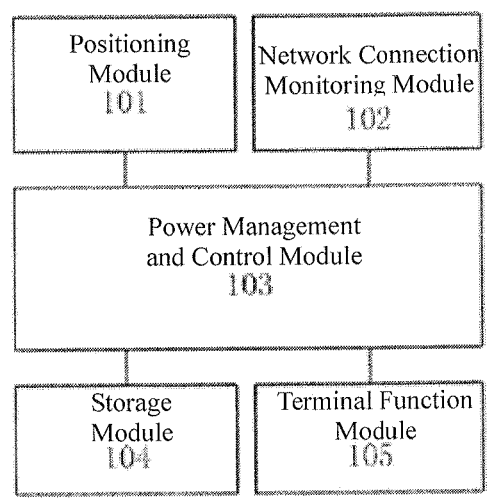

POSITION-BASED MOBILE TERMINAL POWER MANAGEMENT DEVICE

I. TECHNICAL FIELD

The present invention relates to a mobile terminal, in particular to a mobile terminal power management device.

II. BACKGROUND ART

In the prior art, the power consumption of mobile terminal is always a problem that is hard to solve, as smart phones (or mobile terminals) are developed continuously and have richer functions and accordingly have an increasingly higher demand for power. Usually, to reduce the power consumption of a mobile terminal, a user has to disable applications or functional modules that are not used temporarily and then enable them when required. Consequently, the user may feel troublesome and may often forget the operation, and the purpose of power saving can not be attained.

III. CONTENT OF THE INVENTION

Technical Problem

To overcome the drawbacks in the prior art, the object of the present invention is to provide a position-based mobile terminal power management device, which automatically enables or disables the functional modules of a mobile terminal according to the position of the mobile terminal, so as to attain the purpose of power saving.

IV. SOLUTION TO THE PROBLEM

Technical Solution

To attain the object described above, the present invention provides a position-based mobile terminal power management device, comprising a positioning module, a network connection monitoring module, a power management and control module, a storage module, and a terminal function module, wherein, the positioning module is connected to the power management and control module, and is configured to send the position information of the mobile terminal to the power management and control module;

the network connection monitoring module is connected to the power management and control module, and is configured to send the network connection monitoring result of the mobile terminal to the power management and control module;

the power management and control module is connected to the positioning module, the network connection monitoring module, the storage module, and the terminal function module respectively, and is configured to control the enabling and disabling of the terminal function module;

the storage module is connected to the power management and control module, and is configured to store position information and a network connection monitoring statistical list;

the terminal function module is connected to the power management and control module, and is enabled or disabled under the control of the power management and control module.

Wherein, the positioning module is a RF transceiver module or GPS receiver module built in the mobile terminal.

Wherein, the power management and control module employs a microprocessor chip in the mobile terminal.

Wherein, the storage unit employs a memory chip in the mobile terminal.

Wherein, the terminal function module is one or more of WIFI module, GPS module, and mobile network data service module built in the mobile terminal.

With the position-based mobile terminal power management device according to the present invention, the mobile terminal can automatically enable or disable its accessory devices (e.g., WIFI, GPS, mobile network data service devices, etc.) according to its position, so as to attain the purpose of power saving and facilitate the user to use.

Hereunder other characteristics and advantages of the present invention will be described, and will become apparent partially in the description or can be understood from the description of some embodiments.

V. BRIEF DESCRIPTION DRAWINGS

Description of the Drawings

The accompanying drawings are provided to help further understanding of the present invention, and constitute a part of the description. These drawings are used in conjunction with the embodiments to interpret the present invention, but do not constitute any limitation to the present invention. Among the drawings:

FIG. 1 is a functional block diagram of the present invention.

VI. EMBODIMENTS

Detailed Description of the Embodiments

Hereunder some preferred embodiments of the present invention will be described, with reference to the accompanying drawings. It should be appreciated that the embodiments described here are only provided to describe and interpret the present invention, but do not constitute any limitation to the present invention.

FIG. 1 is a functional block diagram of the present invention. As shown in FIG. 1, the position-based mobile terminal power management device according to the present invention comprises a positioning module 101, a network connection monitoring module 102, a power management and control module 103, a storage module 104, and a terminal function module 105, wherein, The positioning module 101 is connected to the power management and control module 103, and is configured to receive the position information of the mobile terminal and send the position information to the power management and control module 103. Preferably, the positioning module 101 according to the present invention is a RF transceiver module or GPS receiver module built in the mobile terminal.

The network connection monitoring module 102 is connected to the power management and control module 103, and is configured to monitor the state of network connection (WLAN or mobile network) of the mobile terminal and send a monitoring result to the power management and control module 103.

The power management and control module 103 is connected to the positioning module 101, the network connection monitoring module 102, the storage module 104, and the terminal function module 105 respectively, and is configured to receive the position information sent from the positioning module 101 and the monitoring result sent from the network connection monitoring module 102 and control the enabling or disabling of the terminal function module

105. Preferably, the power management and control module 103 according to the present invention employs a microprocessor chip of the mobile terminal.

The storage module 104 is connected to the power management and control module 103, and is configured to store position information and a network connection monitoring statistical list. Preferably, the storage unit 104 according to the present invention employs a memory chip of the mobile terminal.

The terminal function module 105 is connected to the power management and control module 103, and is enabled or disabled under the control of the power management and control module 103. Preferably, the terminal function module 105 according to the present invention is a WIFI module, GPS module, or mobile network data service module built in the mobile terminal.

With the position-based mobile terminal power management device according to the present invention, since the user usually uses the mobile terminal in WIFI connected state only at several places that are relatively fixed (e.g., office, restaurant, home, etc.), the position of the mobile terminal in the mobile network (obtained with cell positioning technique, i.e., obtain the LAC, CI, and BSIC at the place where the cell phone is, and thereby calculate the position of the cell phone) can be recorded when the user connects mobile terminal to WIFI. Later, whenever the user enters into the same cell or a neighboring cell (whether the cell is a neighboring one can be ascertained according to the BSIC), the WIFI module of the mobile terminal can be enabled automatically and the mobile network data service module can be disabled automatically; when the user leaves the cell or neighboring cell, the WIFI module can be disabled and the mobile network data service module can be enabled.

Those skilled in the art should appreciate: the embodiments described above are only some preferred embodiments of the present invention, and should not be deemed as constituting any limitation to the present invention. Though the present invention is described and illustrated in detail with reference to the embodiments, those skilled in the art can easily make modifications to the technical solution described above in the embodiments or make equivalent replacement of some technical features. However, any modification, equivalent replacement, or refinement to the embodiments without departing from the spirit and principle of the present invention shall be deemed as falling into the protected scope of the present invention.

The invention claimed is:

1. A position-based mobile terminal power management device, comprising a positioning module, a network connection monitoring circuit, a power management and control module, a storage module, and a terminal function module, wherein, the positioning module is connected to the power management and control module, and sends position information of a mobile terminal at a first location to the power management and control module in response to a wireless connection between the mobile terminal and a WLAN station emitting a WIFI signal at the first location, wherein the position information is obtained using a cell positioning identifier including at least one of a location area code (LAC), a cell ID (CI), and a Base Station Identity Code (BSIC); the network connection circuit is connected to the power management and control module, and is configured to send a network connection monitoring result of the mobile terminal at the first location to the power management and control module; the power management and control module is connected to the positioning module, the network connection circuit, the storage module, and the terminal function module respectively, and is configured to control the enabling and disabling of the terminal function module; the storage module is connected to the power management and control module, and is configured to record the position information of the mobile terminal at the first location using at least one of the LAC, CI, BSID, and the corresponding network connection monitoring result at the first location when the mobile terminal connects to the WLAN station emitting the WIFI signal; wherein the terminal function module is connected to the power management and control module, and is enabled or disabled under the control of the power management and control module.

2. The position-based mobile terminal power management device according to claim 1, wherein, the positioning module is a RF transceiver module or GPS receiver module built in the mobile terminal.

3. The position-based mobile terminal power management device according to claim 1, wherein, the power management and control module employs a microprocessor chip in the mobile terminal.

4. The position-based mobile terminal power management device according to claim 1, wherein, the storage unit employs a memory chip in the mobile terminal.

5. The position-based mobile terminal power management device according to claim 1, wherein, the terminal function module is one or more of WIFI module, GPS module, and mobile network data service module built in the mobile terminal.

* * * * *

UNITED STATES PATENT AND TRADEMARK OFFICE
CERTIFICATE OF CORRECTION

PATENT NO. : 9,723,562 B2  
APPLICATION NO. : 14/416553  
DATED : August 1, 2017  
INVENTOR(S) : Deng Page 1 of 1

It is certified that error appears in the above-identified patent and that said Letters Patent is hereby corrected as shown below:

On the Title Page

Item (73), Assignee: "BARQS WIRELESS LTD." should be --BORQS WIRELESS LTD.--

Signed and Sealed this  
Twenty-ninth Day of May, 2018

Andrei Iancu  
*Director of the United States Patent and Trademark Office*